United States Patent
Gundersen

[15] 3,678,583
[45] July 25, 1972

[54] WORK POSITIONER
[72] Inventor: Ralph W. Gundersen, St. Paul, Minn.
[73] Assignee: Power Drive Corporation, St. Paul Park, Minn.
[22] Filed: Jan. 18, 1971
[21] Appl. No.: 107,064

[52] U.S. Cl. ................................................33/125, 33/138
[51] Int. Cl. ..........................................................G01b 3/10
[58] Field of Search.................................................33/125, 138

[56] References Cited

UNITED STATES PATENTS 2,728,143  12/1955  Buchet........................................33/138
3,180,029  4/1965  Perwas.........................................33/170
2,353,726  7/1944  Guttman..................................33/125 R Primary Examiner—Robert B. Hull
Attorney—Robert M. Dunning

[57] ABSTRACT

A remote work positioning and measuring apparatus adapted to be mounted on a variety of stock handling machines. A slidable work engaging carriage is moved along the working surface by a hand crank. A tape measure extends between the slidable carriage and the frame of the machine, being wound onto spring-loaded reels at both ends. A hand crank allows the tape to be shifted from one reel to another unless an electromagnetic lock is activated to lock the tape with respect to the movable carriage.

10 Claims, 2 Drawing Figures

PATENTED JUL 25 1972

3,678,583

INVENTOR
RALPH W. GUNDERSEN

BY Abraham Dunning
ATTORNEY

WORK POSITIONER

BACKGROUND OF THE INVENTION

In the prior art, machines for cutting and punching large pieces of metal, wood, and the like have generally been clumsy, slow, and required two or more people to operate. The reason for this is that, in order to position the piece of stock being worked, at least two men would have to stretch a tape measure out to the desired length, position the stock on the working surface, and measure the correct distances before the tool operation could be performed. There is accordingly a definite need in the art for a self-contained work positioning apparatus that will permit one man to perform these tasks while remaining near the particular tool being used. My invention provides such a machine allowing a single operator to position a piece of stock under a tool in several different exact locations, move the stock, and measure the stock all from a single location.

SUMMARY OF THE INVENTION

Briefly, my invention contemplates a slidable stock engaging carriage which is clamped to one end of the particular piece of stock being worked. The carriage is moved back and forth along the guide track by means of a hand crank located near the tool end of the machine. Two spring-loaded tape reels are employed, one mounted proximate the tool end of the machine and the other mounted on the sliding carriage. A tape measure is wound between the two reels in such a manner that the spring tensions of the reels oppose each other. Another hand crank near the tool is used to shift the tape measure off of one reel onto the other reel so that the zero mark on the tape can be brought into alignment with a viewing window in front of the operator no matter what the position of the stock is on the table. The tape can then be locked to the movable carriage by an electromagnetic lock controlled by a switch close to the operator. As the carriage and stock are moved by the operator, the tape moves past the viewing window allowing an exact measurement of the amount of movement. It may, therefore, be seen that it is an object of my invention to supply a remote work positioning and measuring machine operable by one person. Further objects and advantages will become apparent from the following description and drawings.

DESCRIPTION OF THE PREFERRED EMBODIMENT

Figure 1:
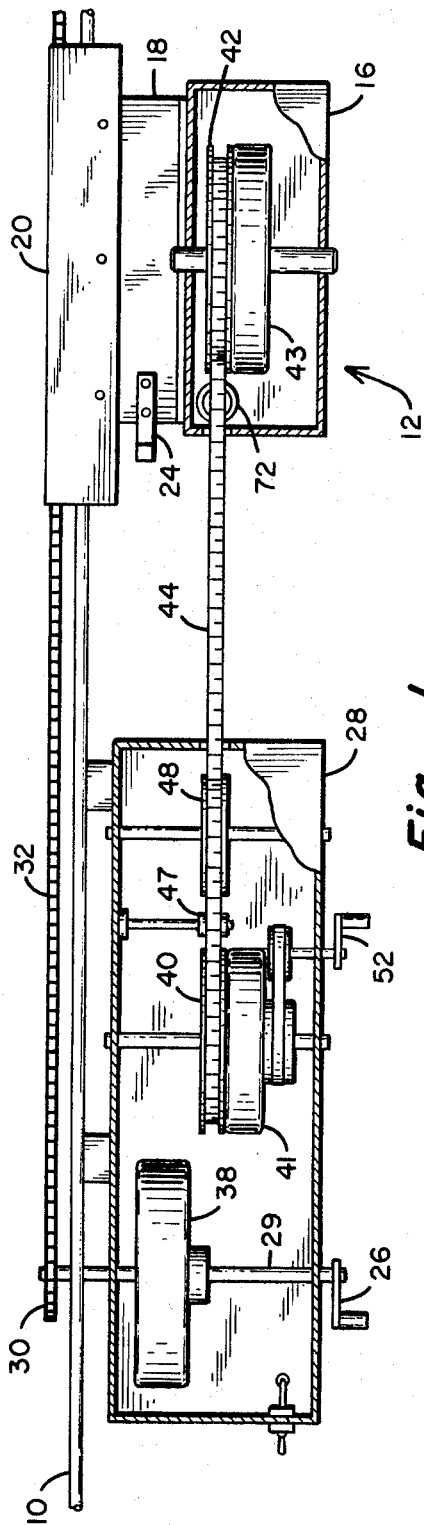
FIG. 1 is a schematic top view of the major components of my invention.
Figure 2:
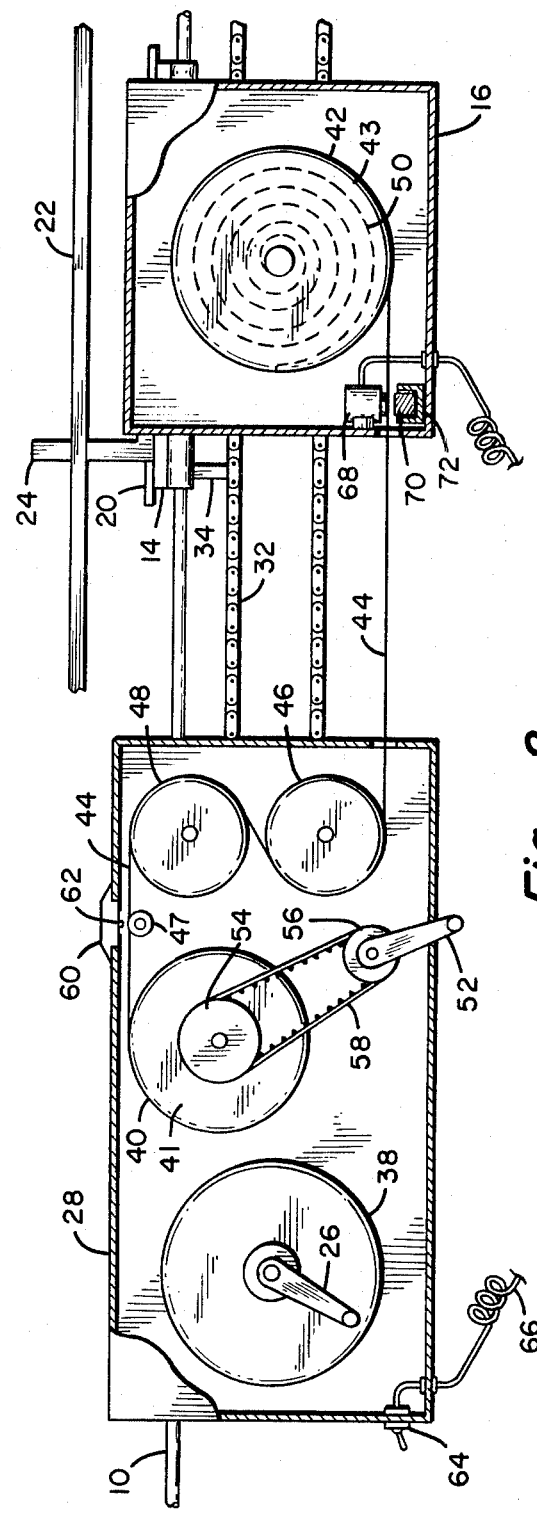
FIG. 2 is a schematic side view of the major components of my invention. Both figures are shown with the protective housings in section so as to permit a clear view of the components inside.

The present invention is designed to work with a wide variety of tools including hydraulic punches, drills, saws, and the like. Normally these tools employ a long table extending off to one side upon which rests the piece of metal tube or angle or other piece of stock upon which work is to be performed, In the past the stock has usually been moved on the table by hand into position under the tool and measurements have been made by hand. My invention, on the contrary, employs a sliding carriage assembly which follows a track along side the table and engages the stock by means of a suitable clamp or clamps well known to those skilled in the art. Referring simultaneously to FIGS. 1 and 2 this track is shown schematically as a track 10. The carriage assembly is shown generally by the numeral 12 and rides on track 10 by means of a sliding bearing 14 of a type commonly available in the art designed to follow track 10. Carriage 12 comprises a housing 16 welded to a connecting member 18 which in turn is bolted to a flange 20 which is mounted on the top of bearing 14. The working table is generally above the carriage assembly 12 in the position shown by a small cut-away working table portion 22 in FIG. 2. A work engaging extension bracket 24 is mounted to member 18 and extends upward either beside or through a slot in the table surface 22. Although not shown in the drawing a clamp of any convenient design is welded or bolted to the top of bracket 24 in a position suitable to engage whatever piece of stock is being worked on top of the table. Consequently, as carriage assembly 12 moves back and forth along guide track 10, extension bracket 24 and the clamp thereon engage the stock on table surface 22 and move it back and forth accordingly. It can be seen in the drawings that the carriage is remotely movable from the tool end of the machine by a hand crank 26 which is mounted in a fixed housing 28. A shaft 29 from hand crank 26 extends through housing 28 to a sprocket 30. A roller chain 32 on sprocket 30 extends along track 10 to connect with a bracket 34 on the bottom of bearing 14. The opposite end of chain 32 is not shown in the drawings since the total length of the machine cannot be included in the limited space of the drawing. Chain 32, however, travels over a suitable idler sprocket at its far end and returns to sprocket 30. A brake 38 is provided on shaft 29 so as to allow the carriage to be locked in any predetermined position. For a more detailed explanation of a brake and chain arrangement such as described here, reference should be had to my co-pending application for "Remote Measuring Apparatus" Ser. No. 76,052 filed Sept. 28, 1970 by the instant inventor.

The improvement contemplated by my invention resides in providing two spring-wound tape reels 40 and 42 positioned respectively in fixed housing 28 and on sliding carriage assembly 12 in housing 16. Extending between reels 40 and 42 is a metal tape measure 44 which passes over a set of idler wheels 46, 47 and 48. Reel 40 is connected to a spring chamber 41 containing a spiral spring connected to urge rotational motion on reel 40 in a direction so as to wind up tape measure 44. In a similar manner reel 42 is connected to a spiral spring containing housing 43. Spiral springs such as this are well known in the art and therefore shown in FIG. 2 only by a spiraled dashed line 50. Spring 50 is designed to urge rotational motion upon reel 42 in a direction so as to wind up the tape measure thereon. It may, therefore, be seen that tape measure 44 is always under tension, being stretched between the two opposing reels 40 and 42 which are arranged to have generally balanced spring forces. Since the forces are generally balanced there is no tendency for the tape measure to roll either onto reel 42 or reel 40. The tape measure can be shifted, however, from one reel to another by rotation of a crank 52 which is connected to reel 40 by means of a pair of pulleys 54 and 56 and a belt 58.

In operation, the operator of the machine simply places the desired piece of stock onto table 22 and clamps it to bracket 24. He then rotates crank 26 so as to move sprocket 30 and chain 32 thus moving the carriage assembly 12 along table surface 22 and moving the stock into the desired position underneath the tool. Having determined the starting point the operator then rotates crank 52 so as to move tape measure 44 until the zero point (or for that matter any other desired starting point) is visible through a magnifying plastic lens 60 which is inserted into housing 28 immediately above tape measure 44. The zero mark is aligned with a suitable cross hair marker 62 which can be drawn or mounted on the bottom of lens 60 as desired. Idler roller 47 insures that tape measure 44 passes immediately underneath magnifying lens 60. With the tape measure in the zero position the operator locks the tape measure to carriage assembly 12 by activating an electric switch 64 which is connected by a flexible cord 66 to an electromagnet 68. Electromagnet 68 is mounted firmly to the wall of housing 16 and attracts a metal slug 70 disposed just beneath tape measure 44 in a hollow receptacle 72. Metal slug 70 moves toward electromagnet 68 compressing metal tape measure 44 therebetween. Since slug 70 is located by receptacle 72 tape measure 44 can no longer move relative to housing 16. Consequently, movement of the stock on the working surface moves tape measure 44 with carriage assembly 12 and past magnifying lens 60 in an amount exactly equal to the distance the stock is moved. If the stock should be moved 16 inches, the operator need only activate the switch locking the tape in place and operate crank 26 until 16 inches of the tape measure has gone past the viewing window 60. He then locks the carriage in place through the use of brake 38 and activates the tool to perform its function. He can then either release brake 38 and continue to move the stock an additional predetermined distance or he can release electromagnet 68 and return the tape measure to the zero position so as to repeat the process. Since all the cranks, the switch and the viewing window are provided in one housing 28 it is clear that the operator need never move from his position near the tool nor will he require the services of someone else to help measure the stock. Hence, it may be seen that all the objectives of my invention have been accomplished.

I claim:

1. A work positioner for indicating the amount of movement of a piece of stock relative to a tool comprising in combination:
   means for moving the stock relative to the tool;
   first reel means mounted to move WITH SAID stock;
   second reel means fixedly mounted relative to said tool;
   a graduated measuring tape extending between and wound onto both of said first and second reel means, said first and second reel means having first and second spring means connected thereto so as to urge the winding of said tape onto both reel means in balanced opposition;
   first crank means for winding and unwinding said second reel means; and
   clamping means operable to to clamp said tape so as to move with said stock.

2. The apparatus of claim 1 including magnifying means positioned to permit easier viewing of said tape.

3. The apparatus of claim 1 in which said clamping means comprises an electromagnetic coil positioned to attract a metal block into contact with said tape.

4. The apparatus of claim 1 in which said means for moving comprises a second crank means mounted on a frame which is stationary relative to said tool and connected to move a stock engaging carriage upon which is mounted said first reel means.

5. The apparatus of claim 4 in which said clamping means comprises an electromagnetic coil positioned on said carriage adjacent said tape and operable to attract a metal block into locking contact with said tape.

6. The apparatus of claim 5 including a magnifying lens on said stationary frame in position to allow a magnified view of said tape.

7. The apparatus of claim 6 in which said first and second crank means comprise hand cranks connected respectively to move said second reel means and said carriage.

8. The apparatus of claim 7 in which said electromagnetic coil is activated by a switch on said stationary frame.

9. The apparatus of claim 8 including a first housing shroud about said carriage and containing said first reel means and said electromagnetic coil and a second housing shroud about said second reel and said crank means.

10. The apparatus of claim 9 including at least one idler wheel in said second housing shroud to guide said tape past said magnifying lens which lens is positioned in the wall of said second housing shroud.

* * * * *